R. B. WEAVER.
DRILLING MACHINE.
APPLICATION FILED SEPT. 15, 1913.
1,191,915.
Patented July 18, 1916.
3 SHEETS—SHEET 3.
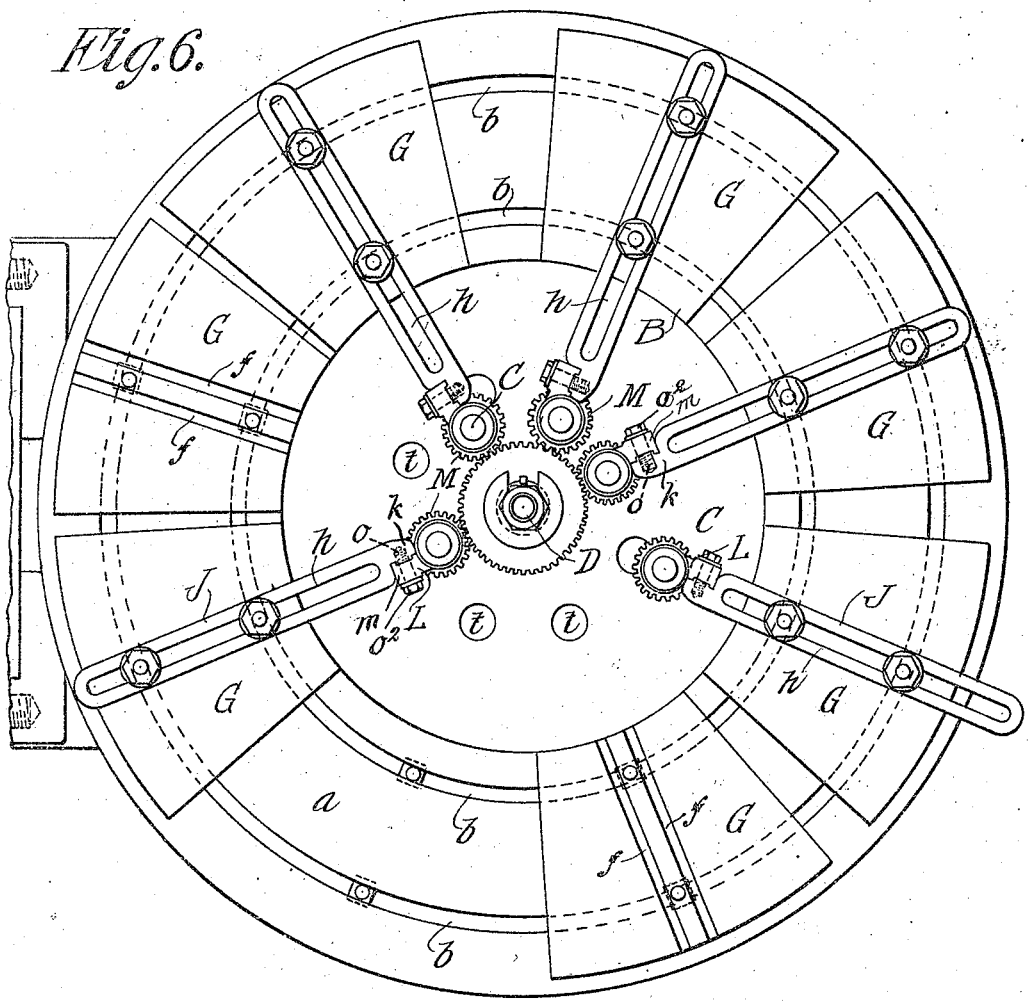
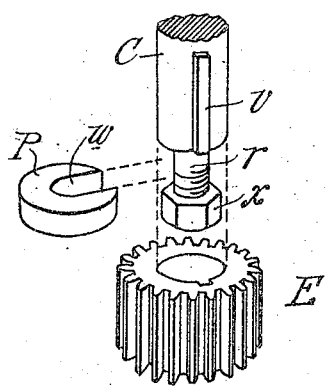
WITNESSES:
R. M. Mowry
W. P. Noble
INVENTOR,
Robert B. Weaver,
BY
ATTORNEY.

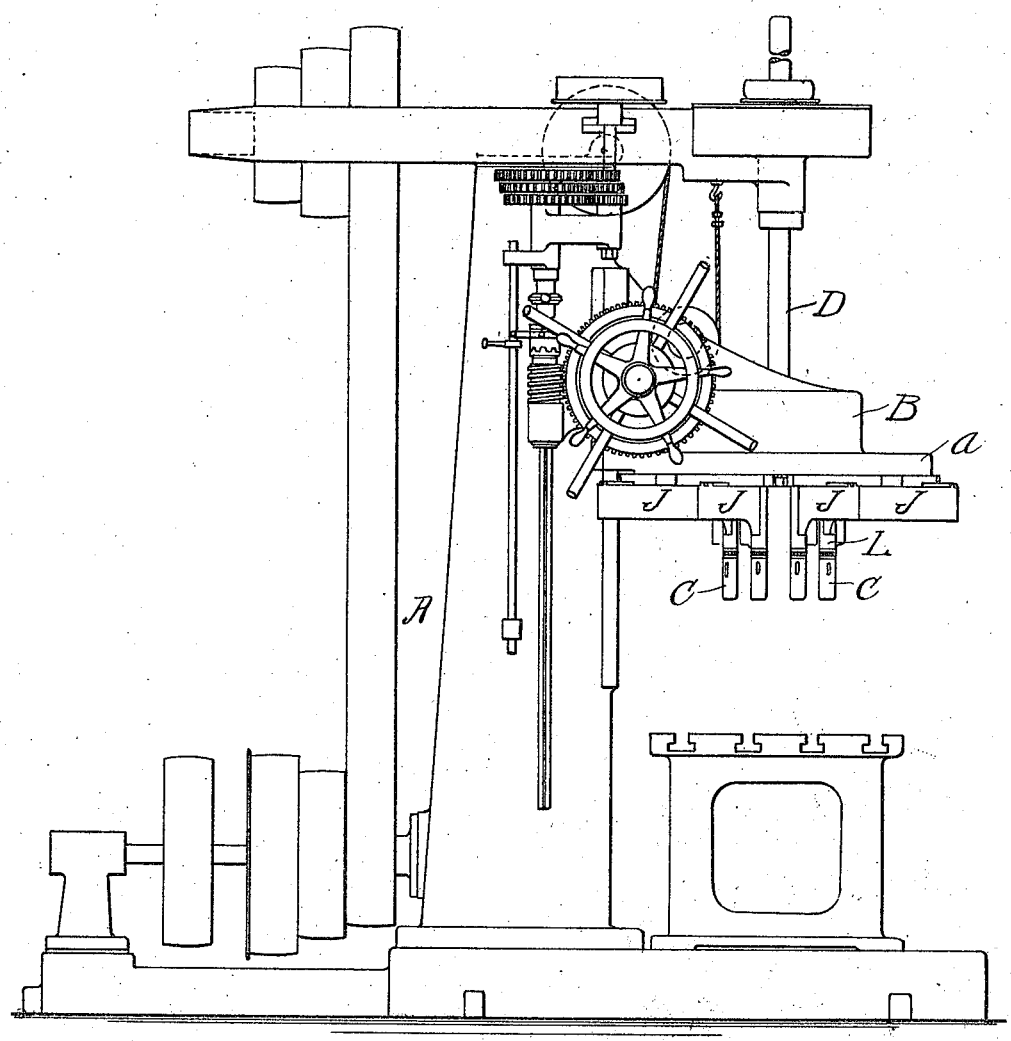

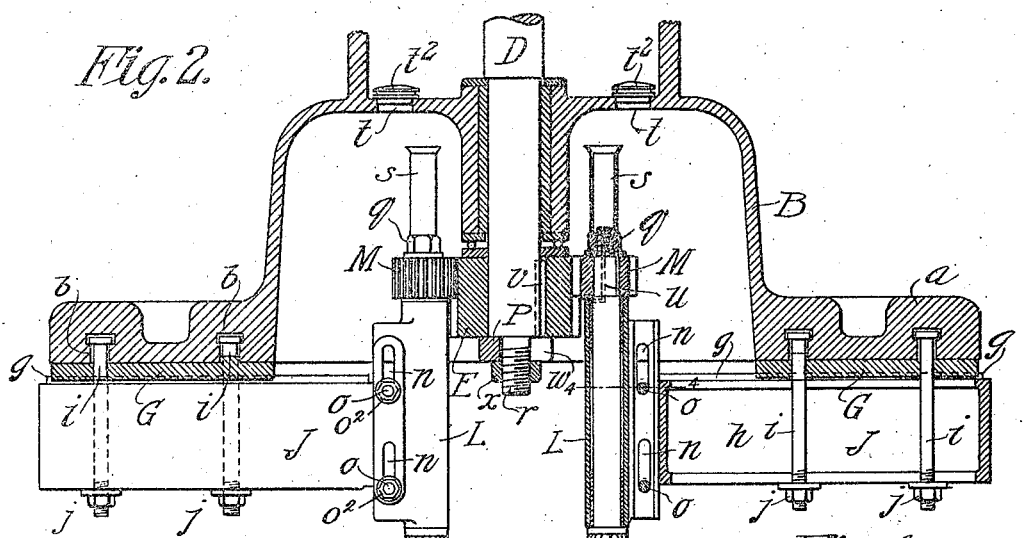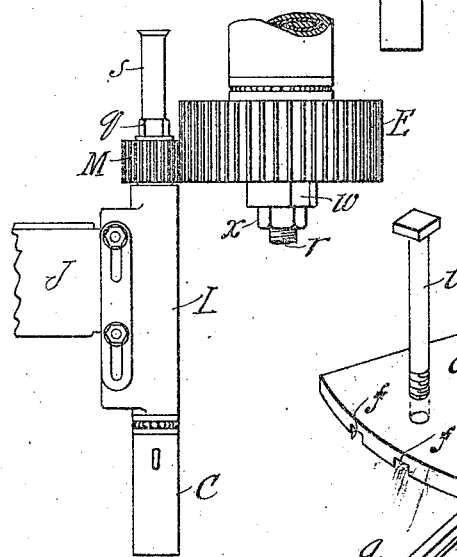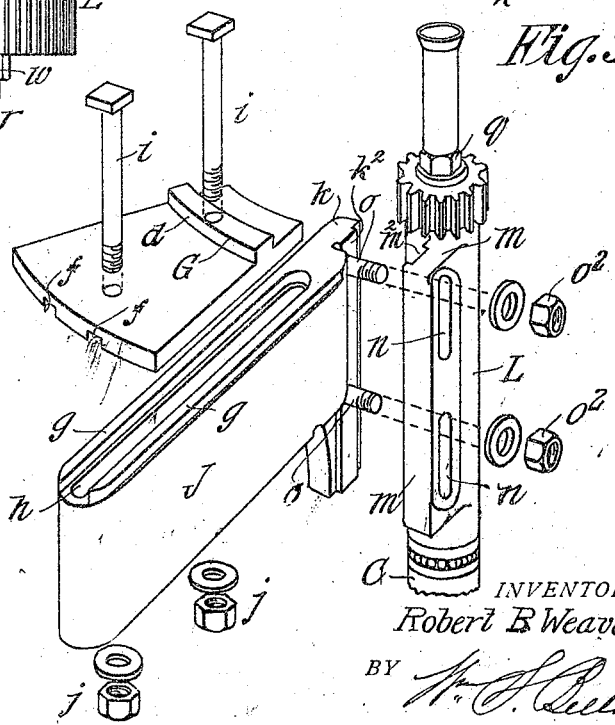

UNITED STATES PATENT OFFICE.

ROBERT B. WEAVER, OF DETROIT, MICHIGAN, ASSIGNOR TO BAUSCH MACHINE TOOL COMPANY, OF SPRINGFIELD, MASSACHUSETTS, A CORPORATION OF MASSACHUSETTS.

DRILLING-MACHINE.

1,191,915. Specification of Letters Patent. Patented July 18, 1916.

Application filed September 15, 1913. Serial No. 789,73?.

*To all whom it may concern:*

Be it known that I, ROBERT B. WEAVER, a citizen of the United States of America, and resident of Detroit, in the county of Wayne and State of Michigan, have invented certain new and useful Improvements in Drilling-Machines, of which the following is a full, clear, and exact description.

This invention relates to a drilling machine of the class in which are comprised multiple drill spindles which are adjustable radially relatively to the feed head in which the drills are carried.

The object of this invention is to provide means whereby the drill spindles have what may be termed "universal adjustments" on the feed head, that is, they may be individually nearer to or farther from the axis of the head as desired, and they may have their arrangements around the feed head either in uniform separation or in unequal separation as may be desired, provision being made for the driving of the spindles, capable of the adjustments as aforesaid, without the requirement of shafts, individual to the drill spindles, made telescopic and with universal joint connections.

The drilling machine constructed under and in accordance with this invention comprises a hollow downwardly opening head having a driving spindle entered centrally therethrough, and provided with a gear wheel and a plurality of drill spindle supports engaged under, and with, the circular lower portion of the head and revolubly adjustable therearound, said supports carrying drill spindles having gear wheels thereon in mesh with the driving spindle gear wheel.

The machine, furthermore, includes the provision of means whereby the drill spindle supports may be also adjusted relatively to the head so that by the use of an interchangeable master gear on the driving spindle and interchangeable gear wheels individually on the drill spindles, such spindles may be operated at any desired distance from the axis of the head.

The machine, furthermore, comprises means appurtenant to the drill spindle holders and the adjustable supports therefor whereby the holders are susceptible of individual vertical adjustments so that in case one or more of the drills used in the machine is shorter than others, they may be all maintained with their points at the same level, or whereby should any occasion render it desirable, some of the drills might be carried higher or lower than other of the drills.

The machine, furthermore, comprises improved provisions for the lubrication of the individual drill spindles through apertures therefor in the upper part of the hollow head and in a very convenient manner. And the machine, furthermore, is provided with means whereby the driving spindle gear wheel, or master gear, may be removed from the spindle for the interchange of another of different size by merely loosening the clamping nut therefor and without the necessity of screwing the nut entirely off from its engagement with the spindle.

The invention is described in conjunction with the accompanying drawings and is set forth in the claims.

In the drawings:—Figure 1 is a side elevation of an upright multiple spindle drilling machine of a well known type, but comprising a feed head combined with which are the new provisions for the various adjustments of the individual drill spindles. Fig. 2 is a vertical sectional view, on a larger scale, of the feed head, drill spindles and the conjunctive devices comprised in the present invention. Fig. 3 is a side view showing the master gear, one of the drill spindle holders with a drill spindle thereon and the drill spindle gear, the gears being of different sizes than, and interchangeable for, those shown in Fig. 2. Fig. 4 is a partial horizontal sectional view on line 4—4, Fig. 2. Fig. 5 is a perspective view showing relatively adjustable parts in separated relations. Fig. 6 is a plan view of the feed head and its equipments, shown inverted, some of the duplicated parts being omitted for increased clearness of illustration. Fig. 7 is a perspective view showing the quick detachable means for confinement of the master gear on the driving spindle.

Similar characters of reference indicate corresponding parts in all of the views.

In the drawings, A represents an upright multiple spindle drilling machine of a usual type, including the head B which carries the multiple drill spindles C C, mechanism shown in a general way in Fig. 1 but not necessary to here describe being also included for imparting the vertical feed and retiring movement to the head B; and in this machine the rotatively driven shaft or spindle D is the one which, suitably rotatively driven, imparts the rotary movements to all of the drill spindles.

The feed head B is made in the form of an inverted basin with a comparatively wide and suitably thickened or reinforced marginal and outwardly extending flange $a$.

The lower extremity of the driving spindle D is entered centrally through the upper part of the hollow head, the latter being constructed thereat for the provision of efficient bearings; and this spindle D has at or near the lower end thereof a detachably connected spur gear wheel E.

The flanged or marginal portion of the feed head B is constructed with concentric circular downwardly opening T-grooves $b$ $b$.

G G represent a set of segmental plates, each having at its upper side an integrally formed arc shaped rib $d$ which is in engagement in the inner one of said T-grooves $b$; and by this manner of rib and groove engagements between the series of plates G and the head, the plates are constrained when they are to be moved for adjustment in circular lines, or with a degree of revolubility, and will be held, when confined, with the utmost stability and against liability of displacement in radial direction. The entire series of the segmental plates G G in their aggregate dimension circularly are insufficient to entirely fill the circular space corresponding to the under surface of the marginal portion of the feed head so that these plates may be spaced at uniform intervals or some may be close together while others may be unusually widely separated. Each of the plates G has a pair of parallel grooves $f$ $f$ in its under side on lines substantially radially of the head, with which engage upstanding ribs $g$ $g$ of support bars J J by which the drill spindles C C are carried in suitable holders L. Each support bar has a comparatively lengthy longitudinally extending slot $h$ extending vertically therethrough.

$i$ $i$ represent bolts, the heads of which are engaged in the T-grooves of the feed head and which are passed through holes therefor in the plates G and through the slots $h$ in the support bars J and on their lower threaded ends they receive the nuts $j$ which when tightened securely clamp the plates firmly to the head and the support bars firmly to the plates.

The drill spindle holders L are vertically adjustable relatively to the support bars J therefor, provisions to this end being in detail as follows: The inner end portion of the support bar and the front portion of the drill spindle holder are formed with integral, matching, lugs or flanges $k$ and $m$, the one having a groove $m^2$ and the other a rib $k^2$; the flange $m$ of the holder L moreover has vertical slots $n$ therein and therethrough, through which engage the bolts or studs $o$ $o$ which are threaded in the flanged extremity $k$ of the support bar J, and on the threaded protruding ends of which the clamping nuts $o^2$ are provided. These bolts as shown in Fig. 4 penetrate with screw engagement into and part way through the flange of the support bar. By temporarily loosening the nuts $o^2$, the drill spindle holders L may be vertically adjusted so that the holders are susceptible of being individually positioned; in case of the drill becoming shortened through breakage and regrinding, it may be held with its point at the same level with the other drills used in the machine; and again it is possible, should it be so desired, that one or more of the drills may be carried higher or lower than other of the drills.

The drill spindles C C journal supported in the axially vertical bores of the drill spindle holders L, have each on its upper end portion a detachably confined spur gear wheel M in mesh with the driving spindle spur wheel or master gear. These spur gear wheels or pinions M, detachably secured on the upper extremities of the drill spindles which are of suitably reduced diameter (the gears being held against relative rotative movement by splines or detachable keys) are clamped by the nuts $q$ which are made with vertical tubular upwardly opening funnel mouthed extensions $s$,—the mouth portions having their locations appropriately close to the top wall of the hollow feed head B in which top wall are the apertures $t$ in circular arrangement and number corresponding to the number of drill spindles. $t^2$ represent removable caps for closing the apertures $t$. These provisions just described render it a quick and convenient matter to lubricate the drill spindles, it being manifest that oil introduced through the apertures, enters the wells therefor formed by the said tubular extensions of the nuts to pass therefrom downwardly through the oil ducts $u$ which extend from the upper ends of the drill spindles suitably far downwardly therein and terminate at the sides of the spindles which are located within their bearing supports.

Inasmuch as in this machine there may be occasion for many interchangings of the gear wheels E and M M for other similar gear wheels, but having different proportionate diameters, graded sets of such gear wheels are provided as appurtenances of this machine.

The driving spindle D has its lower extremity of reduced diameter and screw threaded, above which it has the spline rib $v$.

The master gear E being forced up in engagement with the splined part of spindle, until resisted by the thrust bearing for its spindle D is retained by a collar P which has an aperture w extending from its middle to its edge and which has a straddling relation to the reduced portion r of the spindle,—the nut x completing the confinement of the parts engaged as described.

The nut x is, in its maximum diameter, smaller than the opening through the gear wheel E, while the collar having the aperture is of a diameter greater than the opening through the gear wheel; and by this means it is not necessary, when a master gear is to be secured on, or disconnected from, the driving spindle, to turn the nut x clear off from the screw threaded portion of the spindle, but to merely loosen it sufficiently to permit the collar to be unclamped, whereupon the collar may, because of the aperture w therein, be withdrawn transversely, leaving the master gear free and unobstructed to be slid downwardly off from the shaft, it passing freely over the nut.

As manifest, this machine may be utilized for all the operations possible to be accomplished by the heretofore extensively used upright multiple spindle drilling machine requiring in the organization thereof that the individual drill spindles comprise shaft sections arranged at angles to each other and universally joint connected, and such shaft sections in some instances being of telescopic character.

In this machine, a comparatively large master gear and small drill spindle gears may be employed or vice versa; the circle in which the drill spindles are arranged may be one of comparatively long or short radius, accordingly as a large or small diametered master gear is employed, and the drill spindles at whatever distance from the axis of the feed head may be spaced at uniform separation or at irregular intervals; and when less than all of the drill spindles are needed on any given work, one or several of the drill spindles with their holders or supports may be most conveniently and readily removed from the head, to be as easily replaced when desirable or necessary. The drill spindle holders, moreover, are susceptible of convenient vertical adjustments to rectify any inequalities in the lengths of the different drills of the set used in the machine. And as manifest, this machine when fitted up and adjusted for its work is one in which the operating tools will be always carried on their desired and given set lines without any tendency or possibility of displacement therefrom; and it will also be apparent that the parts comprised in this invention, and above described are of such form and nature as to be subjected to little or no wear in use, thereby conducing greatly to the working life of the machine. Also as manifest, inversions or reversals in the relations of some of the parts and features of the mechanism may be made without departure from the scope of the claims.

I claim:—

1. In a drilling machine, in combination, a hollow downwardly opening non rotative head having a driving spindle entered centrally therethrough and provided with a gear wheel, a plurality of drill spindle supports engaged under and with the circular lower portion of said head and individually bodily circumferentially adjustable therearound, means for restraining the drill spindle supports in relations radial to the central driving spindle, means for the individual confinement of the supports in their circumferentially adjusted positions relatively to the head, and drill spindles carried by the supports having gear wheels thereon in mesh with the gear wheel on the driving spindle.

2. In a drilling machine, in combination, a hollow downwardly opening non rotative head having a driving spindle entered centrally therethrough which is provided with a gear wheel, a plurality of drill spindle supports engaged under and with the circular lower portion of said head which are individually bodily circumferentially adjustable therearound and also radially adjustable relatively thereto, means for restraining the drill spindle supports in relations radial to the central driving spindle, means for the individual confinement of the supports in their adjusted positions relatively to the head, and drill spindles carried by the supports having gear wheels thereon in mesh with the gear wheel on the driving spindle.

3. In a drilling machine, in combination, a hollow downwardly open feed head having a driving spindle entered centrally therewithin which is provided with a gear wheel, a plurality of plates provided at the underside of the marginal portion of the downwardly opening head,—each plate and such head portion having the one an arc shaped rib and the other a correspondingly curved groove for the circumferentially adjustable engagement therein of the rib,—means for the confinement of each plate in its circumferential adjustment relatively to the head as controlled by said rib and groove engagement, members carried by said plates, and drill carrying spindles which are each provided with a gear wheel in mesh with the driving-spindle gear-wheel.

4. In a drilling machine, in combination, a hollow downwardly open feed head having a driving spindle entered centrally therewithin which is provided with a gear wheel, a plurality of plates provided at the underside of the marginal portion of the downwardly opening head,—each plate and such head portion having the one an arc shaped rib and the other a correspondingly curved groove for the circumferentially adjustable engagement therein of the rib,—means for the confinement of each plate in its circumferential adjustment relatively to the head as controlled by said rib and groove engagement, members carried by said plates, and adjustable relatively thereto on lines radially of the head, and carrying drill spindles which are each provided with a gear wheel in mesh with the driving-spindle gear-wheel.

5. In a drilling machine, in combination, a hollow downwardly open feed head having a driving spindle entered centrally therewithin which is provided with a gear wheel, a plurality of plates provided at the underside of the marginal portion of the downwardly opening head; and each plate and such head portion having the one an arc shaped rib and the other a correspondingly curved groove for the adjustable engagement therein of the rib, bolts engaging the plates and head, for the confinement of the former on the latter, members carried by said plates having drill spindles which are each provided with a gear wheel in mesh with the driving spindle gear wheel.

6. In a drilling machine, in combination, a hollow downwardly opening feed head having a driving spindle entered centrally therewithin which is provided with a gear wheel, and having a circular downwardly opening T-groove, a plurality of plates provided at the underside of the marginal portion of the downwardly opening head, and said plates having arc shaped ribs in adjustable engagement in said groove, bolts having their heads engaged in said T-groove and passing through said plates, with confining nuts therefor, and members carried by said plates and which carry drill spindles which are provided with gear wheels in mesh with the driving spindle gear wheel.

7. In a drilling machine, in combination, a hollow downwardly opening feed head having a driving spindle entered centrally therewithin which is provided with a gear wheel, and having a circular downwardly opening T-groove, a plurality of plates provided at the under-side of the marginal portion of the downwardly opening head, and said plates having arc shaped ribs in adjustable engagement in said groove, members carried by said plates, and which are adjustable relatively thereto radially of the head, and which carry drill spindles which are provided with gear wheels in mesh with the driving spindle gear wheel, and bolts having their heads engaged in said T-groove and passing through said plates and said spindle carrying members, with confining nuts therefor.

8. In a drilling machine, in combination, a hollow downwardly opening circular feed head having a driving spindle entered centrally therewithin which is provided with a gear wheel, and having a circular downwardly opening T-groove at its marginal lower portion, a plurality of plates provided at the under side of the marginal portion of the head having arc-shaped ribs in circumferentially adjustable engagement in said groove, members associated with said plates,—said members and plates having interengaging ribs and grooves on lines radially of the head, means for the confinement of the plates as circumferentially adjusted relatively to the head and for the confinement of said members as radially adjusted relatively to the plates, and drill spindles carried by said members which are provided with gear wheels in mesh with the driving spindle gear wheel.

9. In a drilling machine, in combination, a hollow downwardly opening circular feed head having a driving spindle centrally therewithin provided with a gear wheel and having concentric circular downwardly opening T-grooves at its marginal lower portion, a plurality of plates each having an arc shaped rib in adjustable engagement in one of said grooves, and having a pair of grooves radially of the head in its under side, and support bars having parallel ribs at their upper sides for engagements in the grooves of the said plates and each having a longitudinally extending slot extending vertically therethrough and carrying a rotative drill spindle at its inner end provided with a gear wheel in mesh with the driving spindle gear wheel, and bolts, the heads of which are engaged in the T-grooves and which are passed through the plates and bars, and provided with clamping nuts.

10. In a drilling machine, in combination, a hollow downwardly opening circular feed head having a driving spindle entered centrally therewithin which is provided with a gear wheel, and having a circular downwardly opening T-groove at its marginal lower portion, a plurality of plates provided at the under side of the marginal portion of the head having arc-shaped ribs in circumferentially adjustable engagement in said groove, members associated with said plates,—said members and plates having interengaging ribs and grooves on lines radially of the head, means for the confinement of the plates as circumferentially adjusted relatively to the head and for the confinement of said members as radially adjusted relatively to the plates, drill spindle holders, adapted to be vertically adjustably confined on the said members, by the provision to said members and holders of vertical slots in the one thereof and bolts for the other, passed through the slots and having confining nuts therefor, and drill spindles rotatively carried by said members which are provided with gear wheels in mesh with the driving spindle gear wheel.

11. In a drilling machine, in combination, a hollow downwardly open feed head having a driving spindle entered centrally therewithin which is provided with a gear wheel, a plurality of plates provided at the under side of the marginal portion of the downwardly opening head,—each plate and such head portion having the one an arc shaped rib and the other a correspondingly curved groove for the engagement therein of the rib,—and each having a support bar provided at its inner end with a vertically adjustable drill spindle holder, the latter having vertical slots and it and said support bar having a vertical rib and groove engagement, and bolts horizontally projecting from the support bar and passed through the slots in the holder, with confining nuts therefor, bolts engaging the plates, the holder bars associated therewith and the head, provided with clamping nuts, and drill spindles rotatively carried by said holders and having gear wheels in engagement with the driving spindle gear wheel.

12. The combination of a head having a gear-provided driving spindle centrally therein, plates circumferentially adjustable under the marginal portion of the head, supports radially adjustable under and relatively to the plates, spindle holders carried by and vertically adjustable relatively to the supports, means for the confinement of the plates, supports and holders respectively in their adjustments relatively to the head and to each other, and drill spindles in the said holders having gear wheels in mesh with the driving spindle gear wheel.

13. In a drilling machine, in combination, a hollow downwardly opening head provided with a plurality of apertures in the upper wall thereof, a plurality of drill spindle holders supported by the lower portion of said head, and provided with circular spindle receiving bores, drill spindles having their extremities extended through said bores and above the tops of the holders, within said hollow head and having oil ducts opening at their upper ends and terminating at the sides of the spindles, gear wheels engaged on the spindles above the holders, and means for rotating them, and nuts screw engaging the upper ends of the spindles, having clamping engagements against the tops of the drill spindle gears, and provided with vertical tubular upwardly opening extensions accessible for receiving lubricant through said apertures in the top of the head.

Signed by me at Detroit, Michigan, in presence of two subscribing witnesses.

ROBERT B. WEAVER.

Witnesses:
LESLIE WILLIAMS,
J. M. READY.